United States Patent [19]
Thellufsen

[11] 3,765,516
[45] Oct. 16, 1973

[54] BRAKING SYSTEMS FOR AN INTERMITTENT DRIVING MECHANISM

[75] Inventor: Jorn Thellufsen, Soborg, Denmark

[73] Assignee: GNT Automatic A/S, Soborg, Denmark

[22] Filed: Oct. 12, 1972

[21] Appl. No.: 297,089

[30] Foreign Application Priority Data
Oct. 13, 1971 Denmark.................................. 4958/71

[52] U.S. Cl................. 188/85, 188/77 R, 188/136
[51] Int. Cl............................................. F16d 53/00
[58] Field of Search............ 188/77 R, 85, 135–137, 188/171

[56] References Cited
UNITED STATES PATENTS
1,172,956  2/1916  Dickard ........................... 188/137
1,532,515  4/1925  Rhodes ............................ 188/135
2,147,939  2/1939  Tishken ........................... 188/135
3,630,322  12/1971 Keely ............................... 188/135

*Primary Examiner*—Duane A. Reger
*Attorney*—Watson, Cole, Grindle & Watson

[57] ABSTRACT

In a braking system for an intermittent driving mechanism, a braking shoe is arranged for engaging the outer one of two flexible braking rings loosely surrounding a braking drum, a braking finger fast with the braking drum loosely engaging between said braking rings, the braking shoe being mounted at one end of a pivoted braking arm, the other end of which is engageable with a pivoted catch and release member operable by an electro magnet.

1 Claim, 6 Drawing Figures

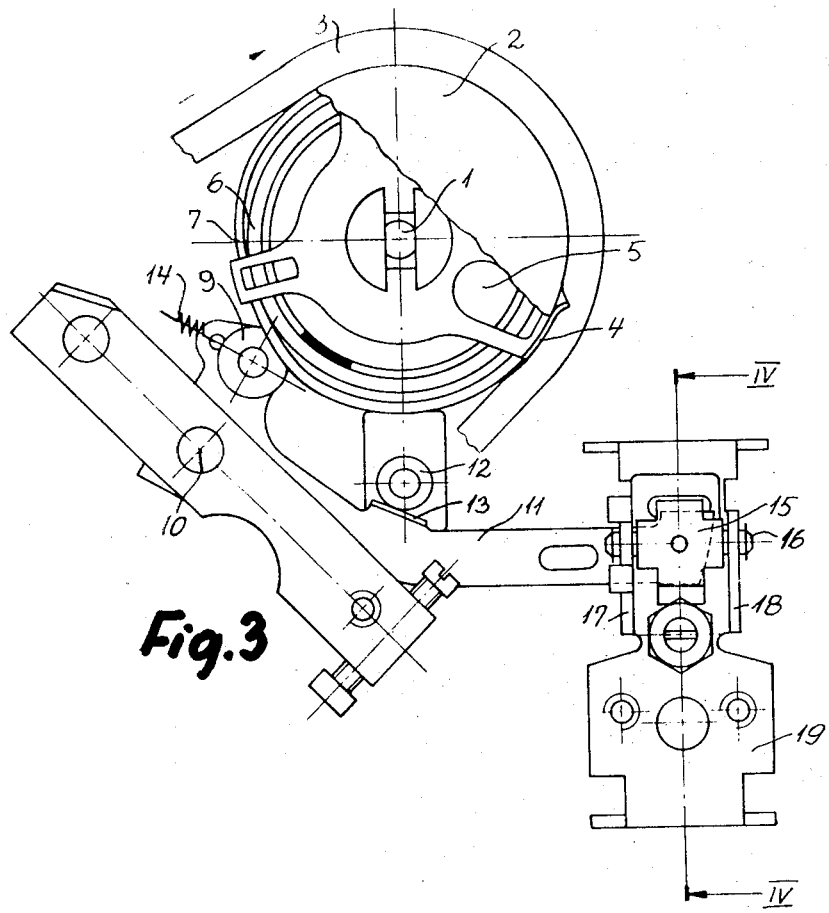
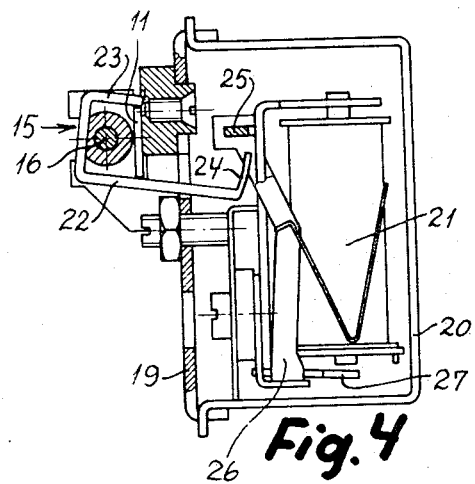

BRAKING SYSTEMS FOR AN INTERMITTENT DRIVING MECHANISM

BACKGROUND OF THE INVENTION

The invention relates to a braking system for an intermittent driving mechanism for a driven shaft, said braking system being of the kind comprising a braking drum fixedly mounted on said driven shaft, two braking rings of flexible material loosely surrounding said braking drum, one of said braking rings loosely surrounding the other, an axially extending braking lug loosely engaging between said braking rings, said braking lug being fixedly connected with said driven shaft, a pivotably mounted braking arm carrying a braking shoe and capable of pivoting movement between a released position and a ready-for-braking position in which latter position said braking shoe engages the outer one of said braking rings, means operable by said driven shaft for moving said braking arm from said released position to said ready-for-braking position and then permitting it to return, and a catching member for withholding said braking arm in said ready-for-braking position, said catching member being releasable by an electro magnet. In a braking system of this kind, as long as the braking shoe is not in the ready-for-braking position, the braking lug can rotate freely between the braking rings which again can rotate freely around the braking drum, but when the braking shoe is moved to the ready-for-braking position, the braking lug, when approaching the angular position of the braking shoe, is jammed between the braking rings and the inner braking ring is thereby at the same time pressed firmly against the braking drum. In this manner the driven shaft is caused to stop instantaneously in a predetermined angular position. The strong braking pressure produces a correspondingly strong reaction force on the braking shoe. In the known braking systems of this type the catching member consists of an abutment on the armature of the electro magnet. Consequently, when the catching member is to be released by the electro magnet, the latter has to overcome the full frictional force resulting from the pressure of the braking arm against the said abutment. The said pressure cannot be reduced ad libitum if the braking arm is not to be made unreasonably long.

SUMMARY OF THE INVENTION

According to the invention, a catching member is used which is tiltable transversely of said braking arm between a releasing position and a catching position and has a first arm engageable by said braking arm during the movement of the latter towards its ready-for-braking position, thereby to tilt said catching member to its catching position, and a second arm engageable behind said braking arm in the catching position of said catching member, said catching member also having a nose engageable in the catching position of said member behind a stop member which is releasable by means of an electro magnet and is located at a greater distance than said braking arm from the tilting axis of said catching member. In this construction the direct blocking and release of the braking arm has been replaced by an indirect blocking and release, the tiltable catching member serving as an intermediary. In this manner the frictional force to be overcome by the electro magnet can be considerably reduced so that a more reliable release can be obtained for a given releasing force exerted by the electro magnet.

BRIEF DESCRIPTION OF THE DRAWINGS

FIGS. 3 and 4 are illustrations corresponding to FIGS. 1 and 2 respectively, but showing the parts in the positions which they assume immediately before the driving of the driven shaft ceases.

DESCRIPTION OF THE PREFERRED EMBODIMENT

Figure 1:
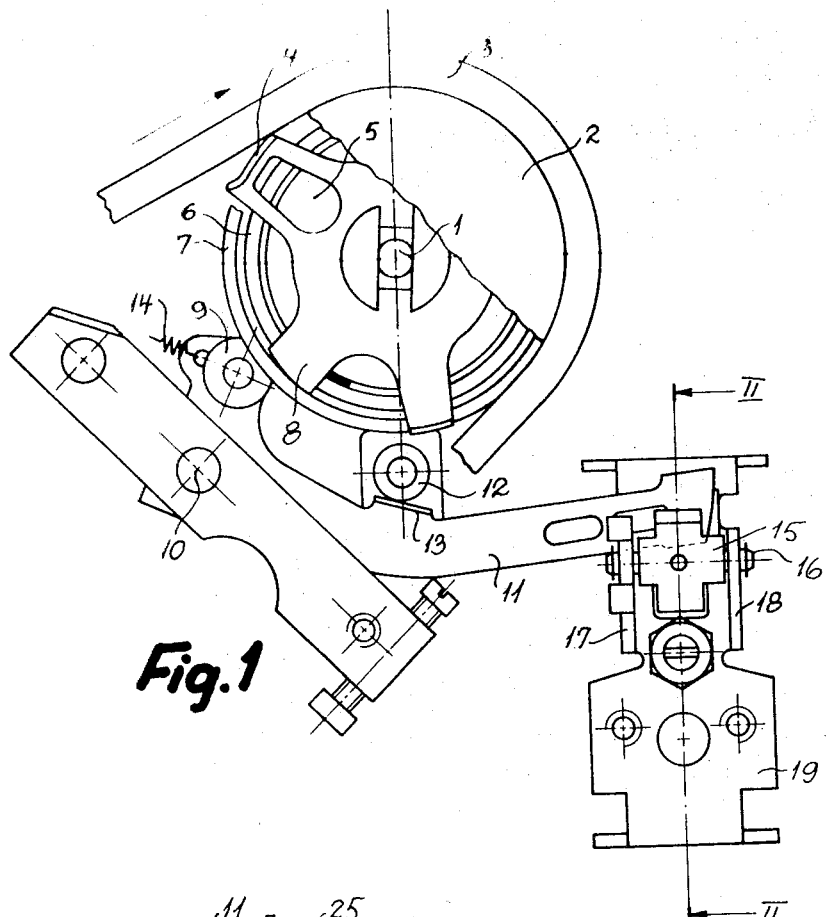
FIG. 1 shows a braking system in combination with parts of a belt drive for the intermittent driving of a driven shaft, as viewed in the direction of that shaft, all parts being shown in the position which they assume immediately before the driven shaft is started rotating.

In the drawing, 1 is a driven shaft which is driven intermittently from a driving shaft by means of a belt transmission substantially of the kind described in the British Pat. specification No. 1,146,150. This, however, is only chosen as an example and the braking system can also be used in connection with other forms of intermittent driving systems. It is presumed that the driven shaft serves to drive devices that require the transmission of a relatively high torque to the driven shaft. In the drawing, 2 is a pulley which is rotatably mounted on the driven shaft and which is engaged by a belt 3 which is driven from a pulley, not shown, on a constantly rotating driving shaft. A disc 30 is fixedly mounted on the driven shaft 1 and carries an axially extending finger 4 which is located outside the circumferential surface of the pulley 2. In the position shown in FIG. 1, the finger 4 does not engage the constantly running driving belt 3 and therefore cannot serve to transmit rotary motion to the driven shaft 1. In order to start the shaft 1 rotating, priming means must therefore be provided for causing the driven shaft to perform an initial rotary motion. Such priming means may e.g., as mentioned in the said British Pat. specification No. 1,146,150, comprise a slip coupling between the pulley 2 and the driven shaft 1, or alternatively a priming spring may be used in well known manner. When the driven shaft 1 has thus been primed, the disc 30 and thereby the finger 4 are rotated together with the shaft 1 and the finger 4 is thereby very quickly engaged with the belt 3 so that the belt 3 now exerts a driving force directly on the finger 4. In contradistinction to the conditions in the priming phase, the relatively high torques necessary for driving the devices coupled to the shaft 1 may now be transmitted to the driving shaft via the direct engagement of the belt 3 with the finger 4.

The driving of the driven shaft by the frictional engagement between the belt 3 and the finger 4 continues until the finger 4 has followed the circumference of the pulley 2 until the point where the belt 3 runs off the pulley 2, i.e., a little longer than to the position shown in FIG. 3. The driven shaft then continues its rotation under the influence of its own momentum and that of the devices driven thereby, until the driven shaft is suddenly braked in the position shown in FIG. 5, such as will be explained in the following.

Figure 5:
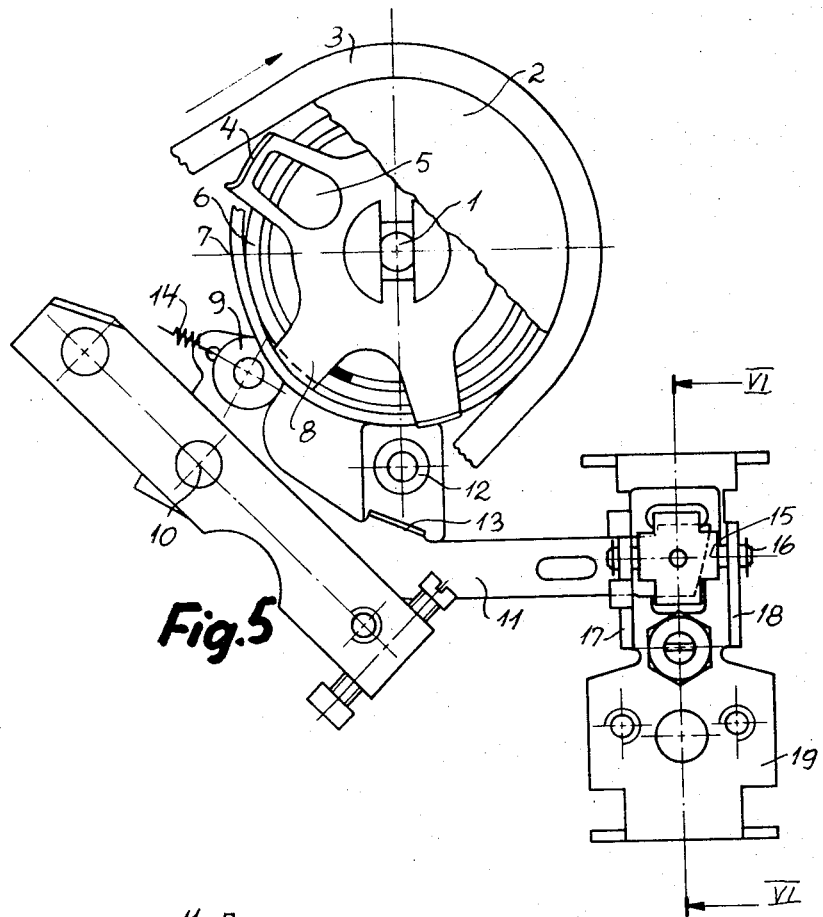
FIGS. 5 and 6 are illustrations corresponding to FIGS. 1 and 2 respectively, but showing the parts in the positions which they assume when braking of the driven shaft takes place.

A braking drum 5 is fixedly mounted on the driven shaft 1 in a position behind the pulley 2, as viewed in FIGS. 1, 3 and 5. Two braking rings 6 and 7 of flexible wear resistant material are mounted at a loose fit around the braking drum 5, the braking ring 7 also surrounding the braking ring 6 at a loose fit. A braking lug 8 carried by the disc 30 engages between the braking rings 6 and 7. The braking lug 8 extends axially and is to be taken as pointing backwards from the plane of the drawing in FIGS. 1, 3 and 5. When the shaft 1 is driven, the braking lug rotates together with the shaft, while the braking rings 6 and 7 owing to the loose fit arrangement perform a less regular, non-controlled rotation so that their angular positions relative to one another and to the braking lug 8 are constantly changed. For this reason the position of engagement between the braking lug and the braking rings is constantly displaced along the length of the latter so that in the long run the wear on the braking rings is distributed over the whole of their length. A braking arm 11 which is pivoted for rotation about a fixed axis 10 carries a braking shoe 9 for engagement with the outer braking ring 7. In FIG. 1, the braking shoe 9 assumes a withdrawn position so that the braking lug may move past the braking shoe without being jammed between the loose braking rings 6 and 7. When the driven shaft 1 is started rotating as described above, a roller 12 which is slidably mounted in the machine frame and is coupled to the driven shaft through suitable transmission means, not shown, is caused to move first downwards, as viewed in FIGS. 1, 3 and 5, and then again upwards. During the downward movement of the roller 12 it engages an abutment 13 of the braking arm and thereby rotates the latter in the clock-wise direction, thereby moving the braking shoe 9 to a ready-for-braking position, see FIG. 3, i.e., a position closer to the braking drum. The braking arm 11 is now locked in the ready-for-braking position by means of the catch and release mechanism described below. However, no braking is effected so far because the braking rings 6 and 7 have sufficient play between the braking shoe and the braking drum to permit continued rotation of the braking drum. However, when the braking lug 8 approaches the angular position of the braking shoe it is jammed between the braking rings 6 and 7 and thereby urges the braking ring 6 strongly against the braking drum so that the driven shaft is suddenly stopped in the angular position determined by the braking shoe, see FIG. 5.

The lug 4 has thereby again arrived in the starting position shown in FIG. 5 and when the braking arm 11 is released by means of the catch and release mechanism to be described below, a new cycle is therefore initiated. Upon release of the braking arm the braking shoe is urged backwards by the braking rings 6 and 7, if found necessary in cooperation with an auxiliary spring 14, and the braking arm is thereby returned in the anti-clockwise direction to the position shown in FIG. 1.

Figure 2:
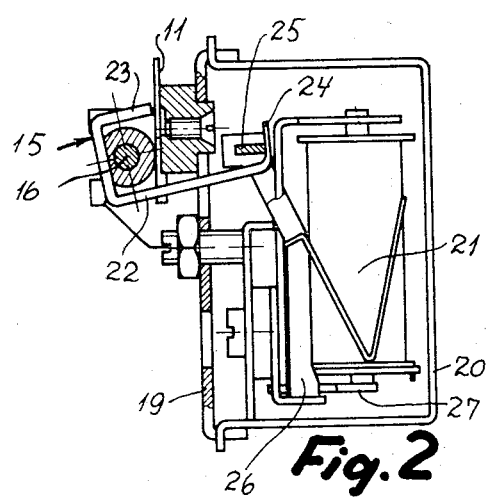
FIG. 2 shows a catching and releasing mechanism forming part of the braking system, as viewed in the direction of arrows II—II in FIG. 1.
Figure 6:
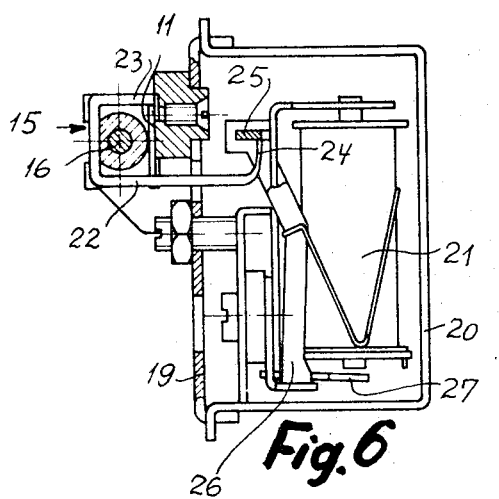

FIGS. 2, 4 and 6 show how the braking arm 11 cooperates with a catching member 15 which is tiltable transversely of the braking arm 11 about a pin 16 which is mounted in front of the braking arm (as seen in FIGS. 1, 3 and 5) on lugs 17 and 18 projecting from a frame 19, 20 located behind the braking arm and serving as a support for an electro magnet 21. The tiltable catching member has a first arm 22 which is located in the path of movement of the braking arm 11 so that the latter, when moving downwards towards its ready-for-braking position tilts the catching member from its releasing position shown in FIG. 2 to its catching position shown in FIG. 4 where a second arm 23 of the catching member engages behind the braking arm, while at the same time a nose 24 on the first mentioned arm 22 is moved down below a stop member 25 mounted on the armature 26 of the electro magnet, said armature being rotatably mounted at the lower end of the electro magnet and carrying a pole piece 27, FIG. 4. In this position the electro magnet is de-energized by electrical control means, not shown, and the armature of the electro magnet is therefore released and moves the stop member 25 to the right as viewed in FIGS. 2, 4 and 6. When the roller 12 is again moved upwards, see FIG. 5, the nose 24 is therefore caught by the stop member 25, see FIG. 6, so that the catching member 15 cannot tilt back to the position shown in FIG. 2. The braking arm 11 can therefore not move past the second arm 23 of the catching member, but is located in the ready-for-braking position so that the braking shoe is ready to brake the driven shaft when the braking lug 8 approaches the angular position of the braking shoe 9 as previously explained. When the driven shaft is to be restarted, the electro magnet 25 is again energized by electrical control means whereby the armature 26 is attracted so as to move the stop member 25 to the left, thereby permitting the nose 24 to pass, see FIG. 2, whereby the catching member 15 is at the same time so tilted that the braking arm 11 can pass the second arm 23 of the catching member. The driven shaft is then again automatically started as previously described, thereby to initiate a new cycle.

I claim:

1. A braking system for an intermittent driving mechanism for a driven shaft, said braking system comprising a braking drum fixedly mounted on said driven shaft, two braking rings of flexible material loosely surrounding said braking drum, one of said braking rings loosely surrounding the other, an axially extending braking lug loosely engaging between said braking rings, said braking lug being fixedly connected with said driven shaft, a pivotably mounted braking arm carrying a braking shoe and capable of pivoting movement between a released position and a ready-for-braking position in which latter position said braking shoe engages the outer one of said braking rings, means operable by said driven shaft for moving said braking arm from said released position to said ready-for-braking position and then permitting it to return, a catching member for withholding said braking arm in said ready-for-braking position, said catching member being tiltable transversely of said braking arm between a releasing position and a catching position and having a first arm engageable by said braking arm during the movement of the latter towards its ready-for-braking position, thereby to tilt said catching member to its catching position, and a second arm engageable behind said braking arm in the catching position of said catching member, said catching member also having a nose engageable in the catching position of said member behind a stop member which is releasable by means of an electro magnet and is located at a greater distance than said braking arm from the tilting axis of said catching member.

* * * * *